US010212472B1

(12) United States Patent
Mclean et al.

(10) Patent No.: US 10,212,472 B1
(45) Date of Patent: Feb. 19, 2019

(54) RECORD ME-A-STREAM

(71) Applicants: Edward D. Mclean, Lockhart, TX (US); James Edward Mclean, Jr., Charlotte, NC (US)

(72) Inventors: Edward D. Mclean, Lockhart, TX (US); James Edward Mclean, Jr., Charlotte, NC (US)

(73) Assignee: Mcleanics Technology Corporation, Charlotte, NC (US)

( * ) Notice: Subject to any disclaimer, the term of this patent is extended or adjusted under 35 U.S.C. 154(b) by 0 days.

(21) Appl. No.: 15/932,103

(22) Filed: Feb. 5, 2018

(51) Int. Cl.
*H04N 21/43* (2011.01)
*H04N 21/433* (2011.01)
*H04N 21/414* (2011.01)
*H04N 21/2187* (2011.01)
*H04N 21/61* (2011.01)
*H04N 21/2743* (2011.01)
*H04N 7/15* (2006.01)

(52) U.S. Cl.
CPC ......... *H04N 21/4334* (2013.01); *H04N 7/155* (2013.01); *H04N 21/2187* (2013.01); *H04N 21/2743* (2013.01); *H04N 21/41407* (2013.01); *H04N 21/4332* (2013.01); *H04N 21/6125* (2013.01)

(58) Field of Classification Search
None
See application file for complete search history.

(56) References Cited

U.S. PATENT DOCUMENTS

| | | | | |
|---|---|---|---|---|
| 2007/0233905 | A1* | 10/2007 | Hatano | H04M 1/6066 710/16 |
| 2011/0249078 | A1* | 10/2011 | Abuan | H04N 7/147 348/14.02 |
| 2017/0092320 | A1* | 3/2017 | Gehring | G10H 1/0033 |

* cited by examiner

*Primary Examiner* — Eileen M Adams

(57) ABSTRACT

The Record Me-A-Stream (RMAS) is a mobile communication system that enables a mobile communication device such as, a smart phone, cell phone, tablet, smart watch, or wearable communication device to record incoming and outgoing live video streams, video calls between mobile devices (mobile-to-mobile live video streams), and video conference calls between mobile devices; and to store these live video stream recordings directly on the mobile communication device in a targeted or designated file; or to upload the recorded live video streams to a platform, network, or server. Also, the RMAS will enable a mobile communication device to record other live streams and regular streams such as, TV and radio broadcast streams, audio books, music videos, music, data, etc., via the internet; and to store these streams directly on the mobile communication device; or to upload the recorded streams to a platform, server, or network.

12 Claims, 4 Drawing Sheets

BLOCK DIAGRAM VIEW OF THE INVENTION

RECORD ME-A-STREAM

CROSS REFERENCE TO RELATED APPLICATION

This Application is related to the Record Me-A-Stream (RMAS) Provisional Patent Application, Application No. 62/497,448 filed on Nov. 21, 2016.

STATEMENT REGARDING FEDERAL SPONSORED RESEARCH

None Applicable.

REFERENCE TO SEQUENCE LISTING, TABLE, OR A COMPUTER PROGRAM LISTING COMPACT DISC APPENDIX

None Applicable.

BACKGROUND OF INVENTION

The Record Me-A-Stream (RMAS) is in the field of mobile communication technology, i.e. smart phones, cell phones, tablets, etc. Prior to the invent of the RMAS, mobile communication technology did not allow or permit a user to record an incoming and outgoing live video stream, video call between mobile communication devices, or a live TV or radio broadcast stream, and to store these recorded live streams directly on the mobile communication device. The RMAS will help to overcome such a situation.

BRIEF DESCRIPTION OF THE INVENTION

The Record Me-A-Stream (RMAS) is a mobile communication system attached to, embedded or installed within, a mobile communication device such as, a smart phone, cell phone, tablet, laptop, or wearable communication device. The RMAS will enable a user to record any incoming and outgoing live video streams, audio streams, or live mobile to mobile audio and video streams.

BRIEF DESCRIPTION OF THE SEVERAL VIEWS OF THE DRAWINGS

Further, FIG. 1 depicts mobile "A" capability of live streaming of movies, videos, and audio books from the internet; and recording these live streams directly on mobile "A", and uploading these recorded streams to a platform, server, or network for storage.

In FIG. 3, the RMAS is depicted as an adaptor type device which is connected to a mobile communication device (i.e. smart phone) by a connection means, and as depicted in FIG. 3, the connection means is a USB connector. The RMAS will connect to the smart phone once the USB connector is inserted into the USB port of the smart phone. Further, this adaptor type RMAS will incorporates a wireless connection means such as, BLUETOOTH, WIFI, or other wireless protocols. Therefore, the mobile communication device can connect to the RMAS wirelessly.

DETAILED DESCRIPTION OF THE INVENTION

Figure 1:
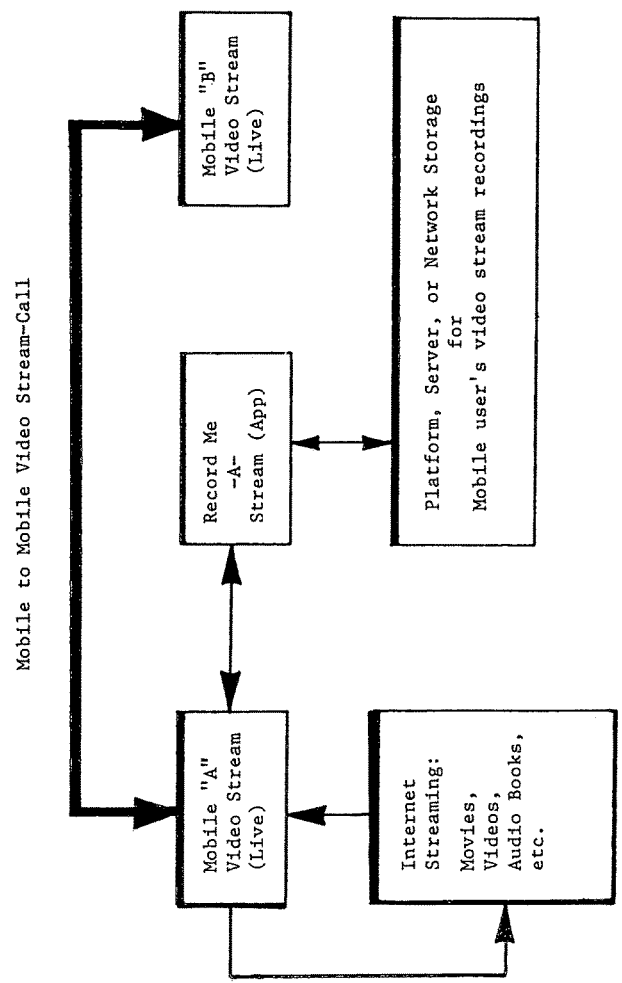
FIG. 1, is the Block Diagram View of the invention. In this figure, the lines and arrows represent data flow and its direction. Also in FIG. 1, the Record Me-A-Stream (RMAS) is depicted as being attached to a mobile communication device identified as Mobile "A". The bold lines and arrows shows mobile "A" and mobile "B" engaged in a "mobile-to-mobile" live audio-video streaming session, i.e. video stream-call. As this process is in session, the user of mobile communication device "A" (Mobile "A") will be able to activate the RMAS App or device to immediately start to record the live mobile-to-mobile streaming session. Immediately after the RMAS is activated, a temporary file is created on mobile "A" wherein the live mobile-to-mobile streaming session is recorded and stored. Once the streaming session is temporarily stored on mobile "A", the user will be able to permanently store the recorded mobile-to-mobile streaming session on mobile "A", or upload the recorded streaming session to a platform, server, or network. Or, the user may elect to playback the recorded mobile-to-mobile session for viewing purposes by means of the RMAS' playback feature. And, the user may elect to delete the recorded session by means of the RMAS' delete feature.
Figure 2:
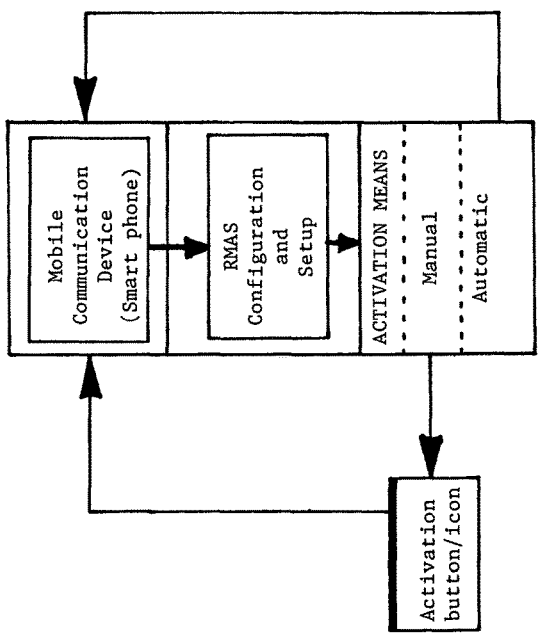
FIG. 2, is the Block Diagram View of the Activation Means of the invention. In this figure, the RMAS is depicted to connect to a mobile communication device. The Activation Means of the RMAS can be configured, setup, or programmed to manual activation or automatic activation. If configured to manual activation, the user of the mobile communication device will have to physically activated the RMAS every time that a streaming session begins by pressing the RMAS' activation icon or button. If configured to automatic activation, the RMAS will immediately activate upon the commencement of any type of streaming session on the mobile communication device. Deactivation is automatic upon termination of the streaming session on the mobile communication device regardless of whether or not the RMAS is configured to manual activation or automatic activation.
Figure 3:
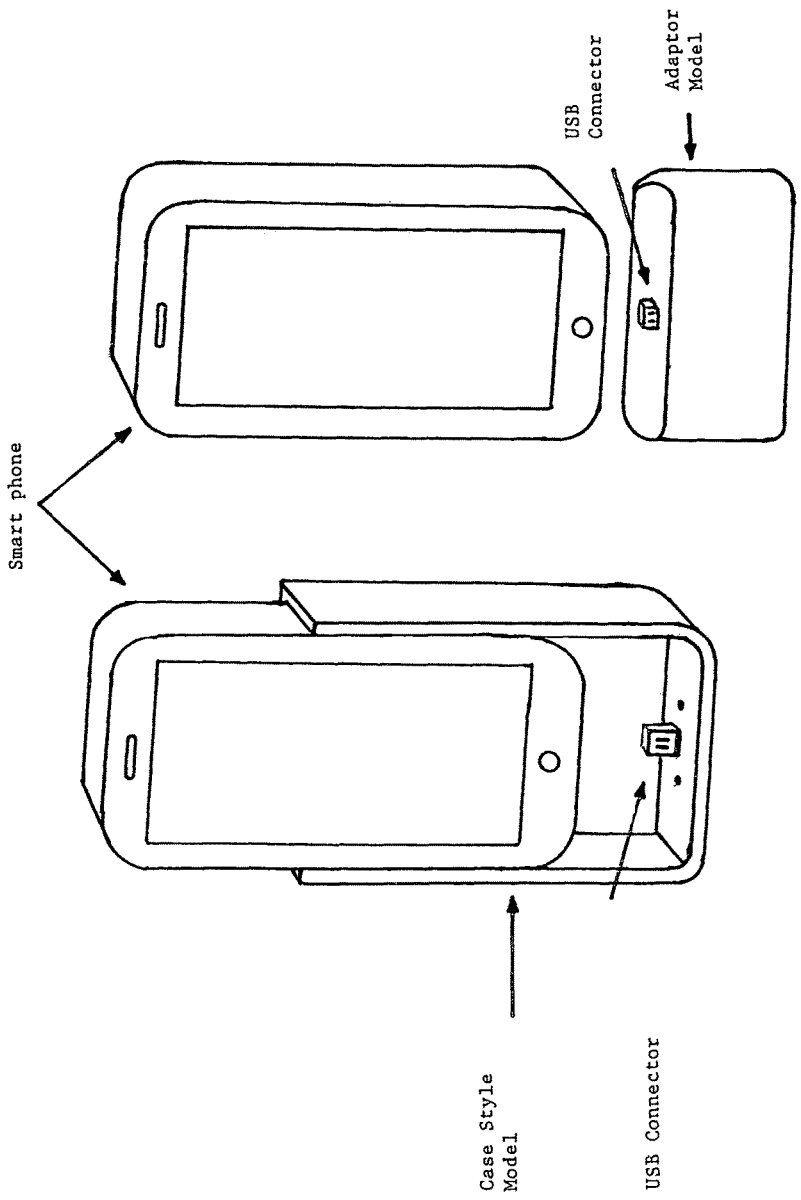
FIG. 3, is the Connectivity View of the invention.
Figure 4:
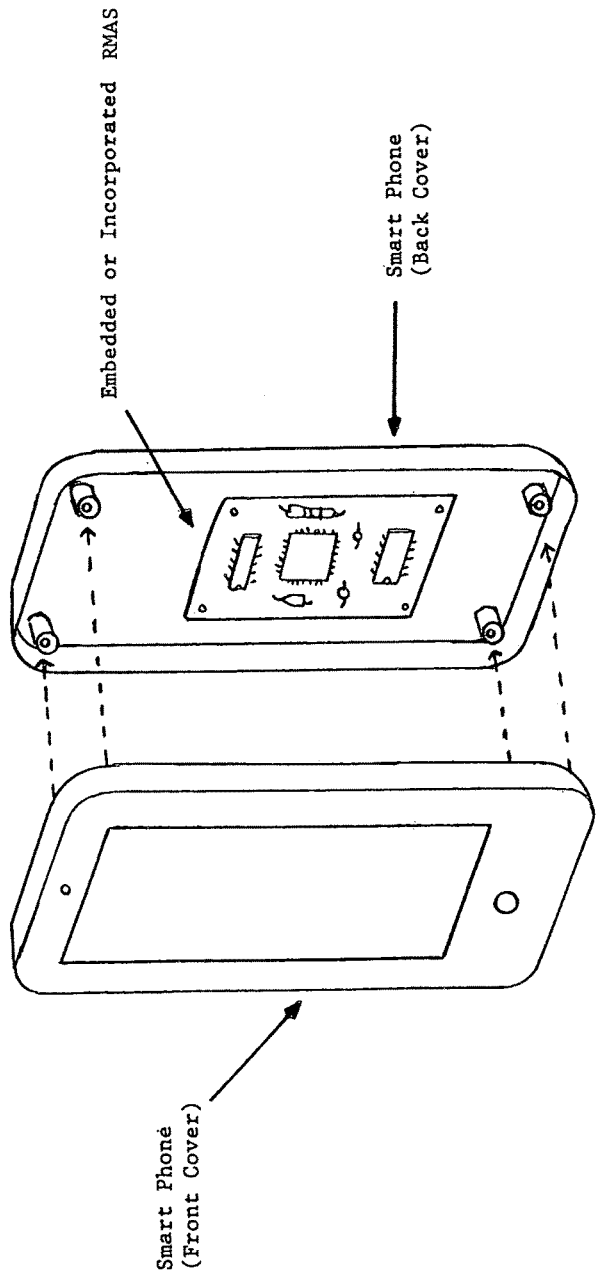
FIG. 4, is the RMAS incorporated or embedded within the circuitry of a mobile communication device (i.e. smart phone). In this arrangement, the RMAS software program, App, or utility files are installed within the mobile communication device, or the mobile communication device is programmed with the RMAS software, App, or utility files so as to produce and control the functions and features of the RMAS within the mobile communication device.

The Record Me-A-Stream (RMAS) is a mobile communication system that enables a mobile communication device such as, a smart phone, cell phone, tablet, smart watch, or wearable communication device to record incoming and outgoing live video streams, video calls between mobile devices (mobile-to-mobile live video streams), and video conference calls between mobile devices; and to store these live video stream recordings directly on the mobile communication device in a targeted or designated file; or to upload the recorded live video streams to a platform, network, or server/service. Also, the RMAS will enable a mobile communication device to record other live streams and regular streams such as, TV and radio broadcast streams, audio books, music videos, music, data, etc., via the internet; and to store these streams directly on the mobile communication device; or to upload the recorded streams to a platform, server, or network.

The RMAS can be an electronic circuit that is incorporated or embedded within the circuitry of a mobile communication device.

The RMAS may be an electronic device that is attached to a mobile communication device by means of a USB port, or some other connection means; or may be attached by a wireless means such as, BLUETOOTH, WIFI, or other wireless means or protocols.

The RMAS may be a mobile communication device programmed with software, App(s), or utility files incorporated within the operating system of the mobile communication device to produce, achieve, and control the functions and features of the RMAS.

For the purposes herein, a mobile communication device shall include a smart phone, cell phone, tablet, wearable communication device, smart watch, mobile computer, two way radio, and marine radio.

Once the RMAS is installed or embedded within, or attached to a mobile communication device, the user of the mobile communication device may record a video stream, or any other streams by pressing a button or icon entitled "RecordMe-A-Stream". Once the streaming recording begins, it will continue until the streaming is terminated, or the user elects to discontinue the process. After the streaming is terminated, the recorded streaming secession will be automatically stored within a temporary file in a directory on the mobile communication device. This file is created simultaneously upon the user pressing the "RecordMe-A-Stream" button or icon. If the user elects, the user may permanently store the recorded streaming file on the mobile communication device, or the user may upload the recorded streaming file to a platform, server, or network for storage. The user will be able to view a listing of all recorded streaming sessions stored on the mobile communication device, platform, server, or network, and playback these recorded streaming sessions by means of a playback feature of the RMAS. Also, the RMAS will permit the user to sort the recorded streams into certain categories such as, Personal Video Call Streams, Video Streams, Movie Streams, Music Streams, Audio Streams, etc.

Unlike today's technology for mobile communication devices which do not allow or permit recording of video call streams, especially from mobile-to-mobile, or any other streaming to a mobile communication device, the RMAS does. The current mobile communication technology is limited to the standard download operations, the RMAS solves this limitation problem. The RMAS will enable a user of a mobile communication device to record his or her video call streams, or any other incoming or outgoing streams, directly on his or her mobile communication device. Therefore, the user will be able to capture rare and special moments that can be played back and viewed time and time again.

We claim:
1. A mobile communication system comprising:
(a) a mobile communication device;
(b) a connection means for connecting said mobile communication system to a mobile communication device, network, server, and platform;
(c) a means for activating said mobile communication system;
(d) a means for recording live incoming and outgoing video streaming directly on said mobile communication device;
(e) a means for recording live mobile to mobile video conference calls and streams on said mobile communication device;
(f) a means to record live TV and Radio broadcast streams on said mobile communication device;
(g) a means for recording audio streams on said mobile communication device;
(h) a storage means for storing said recorded streams on said mobile communication device, and said recorded streams comprising: video streams, mobile to mobile video conference calls and streams, TV and Radio broadcast streams, and audio streams;
(i) a means to upload stored recorded streams on said mobile communication device to a server, network, and platform, and said recorded streams comprising: video streams, mobile to mobile video conference calls and streams, TV and Radio broadcast streams, and audio streams;
(j) a means to playback said recorded streams on said mobile communication device, server, network, and platform; and said recorded streams comprising: video streams, mobile to mobile video conference calls and streams, TV and Radio broadcast streams, and audio streams;
(k) a means to sort said recorded streams by certain categories on said mobile communication device, server, network, and platform;
(l) and, said certain categories are movie streams, video streams, music streams, audio streams, audio books streams, and personal call streams.

2. The mobile communication system, as outlined in claim 1, wherein said mobile communication device is a cell phone.

3. The mobile communication system, as outlined in claim 1, wherein said mobile communication device is a smart phone.

4. The mobile communication system, as outlined in claim 1, wherein said mobile communication device is a wearable communication device.

5. The mobile communication system, as outlined in claim 1, wherein said mobile communication device is a tablet.

6. The mobile communication system, as outlined in claim 1, wherein said mobile communication device is a laptop.

7. The mobile communication system, as outlined in claim 1, wherein said connection means is a wireless connection means.

8. The mobile communication system, as outlined in claim 1, wherein said activation means is automatic.

9. The mobile communication system, as outlined in claim 1, wherein said mobile communication system is a device that is attached to said mobile communication device.

10. The mobile communication system, as outlined in claim 1, wherein said mobile communication system is an electronic circuit that is incorporated within the circuitry of said mobile communication device.

11. The mobile communication system, as outlined in claim 1, wherein said mobile communication device is programmed with software to produce and control the functions and features of said mobile communication system.

12. A mobile communication system comprising:
(a) a mobile communication device;
(b) a connection means for connecting said mobile communication system to a mobile communication device, network, server, and platform;
(c) a means for activating said mobile communication system;
(d) a means for recording live incoming and outgoing video streaming directly on said mobile communication device;

(e) a means for recording live mobile to mobile video conference calls and streams on said mobile communication device;
(f) a means to record live TV and Radio broadcast streams on said mobile communication device;
(g) a means for recording audio streams on said mobile communication device;
(h) a storage means for storing said recorded streams on said mobile communication device, and said recorded streams comprising: video streams, mobile to mobile video conference calls and streams, TV and Radio broadcast streams, and audio streams;
(i) a means to upload stored recorded streams on said mobile communication device to a server, network, and platform, and said recorded streams comprising: video streams, mobile to mobile video conference calls and streams, TV and Radio broadcast streams, and audio streams;
(j) a means to playback said recorded streams on said mobile communication device, server, network, and platform; and said recorded streams comprising: video streams, mobile to mobile video conference calls and streams, TV and Radio broadcast streams, and audio streams;
(k) a means to sort said recorded streams by certain categories on said mobile communication device, server, network, and platform; wherein said certain categories are movie streams, video streams, music streams, audio streams, audio books streams, and personal call streams.

* * * * *